Patented Feb. 4, 1941

2,230,894

UNITED STATES PATENT OFFICE 2,230,894

SYNTHETIC RUBBERLIKE MATERIAL

Walter Gumlich, Leverkusen-Schlebusch, Rhine, Germany, assignor, by mesne assignments, to Jasco Incorporated, a corporation of Louisiana No Drawing. Application November 5, 1938, Serial No. 239,023. In Germany November 10, 1937

2 Claims.  (Cl. 260—93)

The present invention relates to improvements in the plasticising of synthetic rubberlike materials.

It is known that synthetic rubberlike materials prepared by the emulsion polymerization of butadiene-1.3 hydrocarbons or of mixtures of such butadienes with other copolymerizable compounds such as styrene and acrylic or methacrylic acid nitrile are rendered more plastic by exposing the same at an elevated temperature to an oxidizing treatment in the presence of anti-oxidants. The temperature to be employed according to the said process is above about 80° C.

It has now been found that certain auxiliary agents which may be defined as hydrazones from aldehydes or ketones and mono-substituted hydrazines exert an accelerating effect upon the course of this plastifying process. In consequence thereof, the plastifying process can be performed either at a lower temperature or more quickly than it was heretofore possible. In consequence thereof, the present invention allows one to subject to the said oxidizing treatment also the latex-like emulsions of butadiene polymerizates which are obtainable according to the emulsion polymerization process, as is more fully described in the examples. The present invention is operative in all cases of emulsion polymerizates of butadienes-1.3 showing an insufficient plasticity in the heat. The term "butadiene-1.3 emulsion polymerizate" is intended to include also the polymerizates or homologues of butadiene such as isoprene or dimethylbutadiene as well as products of the conjoint polymerization of butadienes and other polymerizable compounds such as styrene and acrylic or methacrylic acid nitrile. Examples for suitable antioxidants are aromatic amines such as alkyl or arylnaphthylamines, alkyl or aryl amino-anthracenes, aldol-naphthyl-amines, diaryl-phenylene diamines, furthermore alkylated phenols and the sulfides or polysulfides thereof (confer the co-pending application Serial No. 181,604 to Hagen, Dennstedt and Becker now issued as U. S. Patent 2,175,082 dated Oct. 3, 1939) and the products which are obtainable by causing acid catalysts to react upon aromatic vinyl compounds and aromatic hydroxy compounds (confer the co-pending application Serial No. 125,434 to Rosenthal and Meis now issued as U. S. Patent 2,224,837 dated Dec. 10, 1940). These antioxidants are preferably employed in an amount of up to about 4% calculated on the amount of polymerizate. Depending on the nature and the amount of the anti-oxidants the temperature may vary within wide limits.

Amongst the new auxiliary agents of the character described there are preferably employed those prepared from aromatic hydrazines such as phenylhydrazine or substitution products thereof (for instance nitrophenylhydrazine) by the action of aromatic aldehydes or ketones such as benzaldehyde, cinnamic aldehyde, benzophenone or salicylic aldehyde. The new auxiliary agents are effective even if employed in a very small proportion of for instance, 0.5 to about 3% calculated on the amount of the polymerized products.

The following examples illustrate my invention it being to be understood that the hydrazones mentioned therein are given only by way of example and that other hydrazones such as those obtained from nitrophenyl hydrazine and phenyl hydrazine on the one hand and from benzophenone or salicylic aldehyde on the other hand have been employed with the same success. The parts are by weight unless otherwise stated.

Example 1

Within a latex of synthetic rubber, which has been prepared by the emulsion polymerization of 75 parts of butadiene and 25 parts of styrene, there are incorporated first 3 parts of phenyl-β-naphthylamine and then 1 part of benzaldehyde phenyl-hydrazone. A current of air is then introduced for 24 hours while stirring and while heating the reaction mixture to 60-70°. The rubber obtained from this latex after coagulation shows a considerably improved plasticity. The viscosity of its solution in benzene is much lower than that of a product which has not been subjected to the said aftertreatment.

Example 2

Within a mixed polymerizate which has been prepared by the emulsion polymerization of 75 parts of butadiene and 25 parts of styrene or acrylic acid nitrile there are incorporated on the roller 3 parts of phenyl-β-naphthylamine and then 1.3 part of cinnamic aldehyde-phenyl hydrazone while heating for 24 hours to 70°. An adhesive product is thus obtained which shows a higher plasticity and a considerably improved workability when compared with a polymerizate prepared without the addition of cinnamic aldehyde-phenyl hydrazone. When vulcanized the polymerizates thus treated show a considerably improved elongation the other mechanical properties being by no ways impaired. The same effect is reached when working with the phenyl hydrazone of benzophenone or acetophenone respectively.

I claim:

1. The process which comprises exposing at an elevated temperature synthetic rubberlike materials prepared by the emulsion polymerization of butadiene-1.3 hydrocarbons to an oxidizing treatment by means of oxygen in the presence of anti-oxidants and of hydrazones prepared from mono-substituted hydrazines.

2. The process as claimed in claim 1, wherein the products of the reaction of aromatic hydrazines and aromatic aldehydes are employed.

WALTER GUMLICH.